(12) United States Patent
Wood

(10) Patent No.: US 6,518,224 B2
(45) Date of Patent: Feb. 11, 2003

(54) DRILLING FLUIDS

(76) Inventor: Robert R. Wood, 8206 Forest Ridge Rd., Spring, TX (US) 77379

(*) Notice: Subject to any disclaimer, the term of this patent is extended or adjusted under 35 U.S.C. 154(b) by 0 days.

(21) Appl. No.: 09/767,352

(22) Filed: Jan. 23, 2001

(65) Prior Publication Data

US 2002/0010100 A1 Jan. 24, 2002

Related U.S. Application Data

(60) Provisional application No. 60/177,640, filed on Jan. 24, 2000.

(51) Int. Cl.[7] .............................. C09K 7/00; C09K 7/06
(52) U.S. Cl. ..................... 507/118; 507/117; 507/903; 523/130; 175/72
(58) Field of Search ................................ 507/117, 118, 507/903; 523/130; 175/72

(56) References Cited

U.S. PATENT DOCUMENTS

| | | | |
|---|---|---|---|
| 2,342,588 A | | 2/1944 | Larkin |
| 2,743,233 A | | 4/1956 | Fisher |
| 2,894,906 A | * | 7/1959 | Sheeler ........................ 507/117 |
| 3,254,064 A | | 5/1966 | Nevins |
| 3,785,438 A | | 1/1974 | Jackson et al. |
| 3,788,405 A | | 1/1974 | Taylor |
| 4,360,620 A | | 11/1982 | Lindner et al. |
| 4,510,998 A | | 4/1985 | Peiffer |
| 4,633,950 A | | 1/1987 | Delhommer et al. |
| 4,704,213 A | | 11/1987 | Delhommer et al. |
| 5,238,977 A | | 8/1993 | Piejko et al. |
| 5,779,787 A | | 7/1998 | Brothers et al. |
| 6,017,854 A | | 1/2000 | Van Slyke |

FOREIGN PATENT DOCUMENTS

SU        1121396      * 10/1984

OTHER PUBLICATIONS

Kirk–Othmer, Encyclopedia of Chemical Technology, vol. 7, 2nd Edition, pp. 297–299, (1965).*

* cited by examiner

Primary Examiner—Philip Tucker
(74) Attorney, Agent, or Firm—Fulbright & Jaworski LLP

(57) ABSTRACT

The invention is a novel drilling fluid additive comprising particles of elastomer which are capable of swelling upon contact with a hydrocarbon fluid. The swelling of the elastomer is gradual, allowing the elastomer to reach the lost circulation zone before significant swelling occurs. Once in the lost circulation zone, the polymer expands sealing off the lost circulation zone. A method for preventing drilling fluid loss is also provided.

14 Claims, No Drawings

DRILLING FLUIDS

This application claims priority to U.S. Provisional Patent Application Ser. No. 60/177,640, filed Jan. 24, 2000.

The invention relates to improved drilling fluids which contain fine particles of crosslinked elastomer. The elastomer acts as a plugging agent thereby preventing loss of the drilling fluid to a porous formation. A method for preventing loss of drilling fluids is also provided.

Drilling fluids, or drilling muds as they are sometimes called, are slurries used in the drilling of wells in the earth for the purpose of recovering hydrocarbons and other fluid materials. Drilling fluids have a number of functions, the most important of which are: lubricating the drilling tool and drill pipe which carries the tool, removing formation cuttings from the well, counterbalancing formation pressures to prevent the inflow of gas, oil or water from permeable rocks which may be encountered at various levels as drilling continues, and holding the cuttings in suspension in the event of a shutdown in the drilling and pumping of the drilling fluid.

For a drilling fluid to perform these functions and allow drilling to continue, the drilling fluid must stay in the borehole. Frequently, undesirable formation conditions are encountered in which substantial amounts or, in some cases, practically all of the drilling fluid may be lost to the formation. Drilling fluid can leave the borehole through large or small fissures or fractures in the formation or through a highly porous rock matrix surrounding the borehole.

Most wells are drilled with the intent of forming a filter cake of varying thickness on the sides of the borehole. The primary purpose of the filter cake is to reduce the large losses of drilling fluid to the surrounding formation. Unfortunately, formation conditions are frequently encountered which may result in unacceptable losses of drilling fluid to the surrounding formation despite the type of drilling fluid employed and filter cake created.

A variety of different substances are now pumped down well bores in attempts to reduce the large losses of drilling fluid to fractures and the like in the surrounding formation. Different forms of cellulose are the preferred materials employed. Some substances which have been pumped into well bores to control lost circulation are: almond hulls, walnut hulls, bagasse, dried tumbleweed, paper, coarse and fine mica, and even pieces of rubber tires. These and other prior art additives are described in U.S. Pat. No. 4,498,995.

Another process that is employed to close off large lost circulation problems is referred to in the art as gunk squeeze. In the gunk squeeze process, a quantity of a powdered bentonite is mixed in diesel oil and pumped down the well bore. Water injection follows the bentonite and diesel oil. If mixed well, the water and bentonite will harden to form a gunky semi-solid mess, which will reduce lost circulation. Problems frequently occur in trying to adequately mix the bentonite and water in the well. The bentonite must also be kept dry until it reaches the desired point in the well. This method is disclosed in U.S. Pat. No. 3,082,823.

Many of the methods devised to control lost circulation involve the use of a water expandable clay such as bentonite which may be mixed with another ingredient to form a viscous paste or cement. U.S. Pat. No. 2,890,169 discloses a lost circulation fluid made by forming a slurry of bentonite and cement in oil. The slurry is mixed with a surfactant and water to form a composition comprising a water-in-oil emulsion having bentonite and cement dispersed in the continuous oil phase. As this composition is pumped down the well bore, the oil expands and flocculates the bentonite which, under the right conditions, forms a filter cake on the well bore surface in the lost circulation area. Hopefully, the filter cake will break the emulsion causing the emulsified water to react with the cement to form a solid coating on the filter cake. But such a complex process can easily go wrong.

U.S. Pat. No. 3,448,800 discloses another lost circulation method wherein a water soluble polymer is slurried in a nonaqueous medium and injected into a well. An aqueous slurry of a mineral material such as barite, cement or plaster of paris is subsequently injected into the well to mix with the first slurry to form a cement-like plug in the well bore.

U.S. Pat. No. 4,261,422 describes the use of an expandable clay such as bentonite or montmorillonite which is dispersed in a liquid hydrocarbon for injection into the well. After injection, the bentonite or montmorillonite will expand upon contact with water in the formation. Thus, it is hoped that the expanding clay will close off water producing intervals but not harm oil producing intervals.

A similar method is disclosed in U.S. Pat. No. 3,078,920 which uses a solution of polymerized methacrylate dissolved in a nonaqueous solvent such as acetic acid, acetic anhydride, propionic acid and liquid aliphatic ketones such as acetone and methyl-ethyl ketone. The methacrylate will expand upon contact with formation water in the water-producing intervals of the well.

It has also been proposed to mix bentonite with water in the presence of a water-soluble polymer which will flocculate and congeal the clay to form a much stronger and stiffer cement-like plug than will form if bentonite is mixed with water. U.S. Pat. No. 3,909,421 discloses such a fluid made by blending a dry powdered polyacrylamide with bentonite followed by mixing the powder blend with water. U.S. Pat. No. 4,128,528 claims a powdered bentonite/polyacrylamide thickening composition prepared by mixing a water-in-oil emulsion with bentonite to form a powdered composition which rapidly becomes a viscous stiff material when mixed with water. U.S. Pat. Nos. 4,503,170; 4,475,594; 4,445,576; 4,442,241 and 4,391,925 teach the use of a water expandable clay dispersed in the oily phase of a water-in-oil emulsion containing a surfactant to stabilize the emulsion and a polymer dispersed in the aqueous phase. When the emulsion is sheared, it breaks and a bentonite paste is formed which hardens into a cement-like plug. The patent discloses the use of such polymers as polyacrylamide, polyethylene oxide and copolymers of acrylamide and acrylic or methacrylic acid.

A group of oil absorbent polymers is disclosed in U.S. Pat. Nos. 4,191,813; 4,263,407; 4,384,095 and 4,427,793. U.S. Pat. No. 4,191,813 discloses lightly crosslinked copolymers containing at least 40% by weight of vinylbenzyl chloride, the balance of monomers, if any, comprising a major portion of aromatic monomers, with the copolymer being crosslinked in a swollen state by a Lewis acid catalyst. The preferred comonomers are one or more of styrene, divinylbenzene and acrylonitrile. U.S. Pat. No. 4,263,407 discloses similar copolymers wherein the copolymer is post-crosslinked in a swollen state in the presence of a Friedel-Crafts catalyst with a crosslinker selected from a polyfunctional alkylating or acylating agent and a sulfur halide.

Another group of highly hydrocarbon absorbent copolymers is disclosed in U.S. Pat. Nos. 4,384,095 and 4,427,793. They describe a crosslinked linear addition copolymer which contains repeating units of vinylbenzyl alcohol and at least one other alpha, beta-monoethylenically unsaturated monomer different from vinylbenzyl alcohol, wherein the vinylbenzyl alcohol units comprise about 0.5% to about 20% by weight of the linear polymer. The preferred comonomers are styrene, methylmethacrylate, vinyltoluene and vinylpyridine. The copolymers disclosed in all four of these patents absorb from two to ten times their weight in hydrocarbons and may swell up to ten times their original volume.

Oleophilic polymers for separating oil from water which show significant swelling in volume upon absorption of oil are described in U.S. Pat. No. 4,172,031. These polymers include polymers of styrenes and substituted styrenes, polyvinyl chloride copolymers of vinylchloride such as a copolymer of 60 wt % vinylchloride and 40 wt % vinylacetate, polymers and copolymers of vinylidene chloride and acrylonitrile, and acrylic polymers such as polymers of methylmethacrylate and ethylacrylate, styrene and divinylbenzene copolymers and alkyl styrene polymers and copolymers. The reference discloses that these polymers show significant swelling in volume upon absorption of oil.

U.S. Pat. No. 4,633,950 discloses the use of oil swelling polymers to reduce lost circulation in drilling fluids. In this patent, the polymers are introduced in an aqueous solution to prevent absorption of the hydrocarbon fluid until the polymers reach the well head.

While the above inventions purport to be effective in reducing loss of drilling fluids, there continues to be a need for effective and inexpensive additives for well bore fluids which can prevent or stop the loss of the fluids into the subterranean formation.

SUMMARY OF THE INVENTION

The invention relates to an improved additive for a drilling fluid which significantly reduces the loss of fluid to the surrounding subterranean structure while maintaining the lubricity of the drilling fluid. The novel additive comprises finely ground elastomer particles.

Loss of drilling fluid occurs when drilling fluid seeps into the subterranean formation through holes, fractures or fissures in the formation. The region in the well where this occurs is referred to as the lost circulation zone. When elastomer particles are added to a drilling fluid, they form a seal in the lost circulation zone by expanding in size to seal the fractures or fissures. This prevents further loss of drilling fluid into the formation.

In contrast to other elastomer based additives discussed above, the present system uses fine elastomer particles which are easily pumped into the well but are capable of swelling to 80% to 140% more than their original size when exposed to hydrocarbon fluids. Their ability to swell makes the elastomer particles extremely effective at preventing loss of drilling fluid into the subterranean formation. When the elastomer particles are used with hydrocarbon-based drilling fluids or with a hydrocarbon additive, particles gradually expand, allowing the material to be easily pumped before significant expansion of the particles occurs. That most of the swelling occurs after the elastomer particles are in the desired location in the well eliminates the need for protective coatings or an aqueous pill to prevent swelling of the polymer until it has reached the desired region in the well.

Another advantage of the elastomer particles is their very low density as compared to conventional materials used to prevent fluid loss. The low density of the elastomer particles allows them to be used in higher amounts than conventional fluid loss materials.

The fluid loss prevention system of the invention require no additional additives other than those normally encountered in drilling fluid such as diesel, oil, other hydrocarbon fluid and water. The elastomer particles are easily handled and present little if any industrial hazards. Moreover, since the preferred source of the fluid loss agents of the invention are prepared from recycled tires, the invention presents a way to effective use the old tire materials rather than allowing them to collect to form hazardous waste sites.

The invention also relates to a method for reducing drilling fluid loss by adding finely ground elastomer particles to a drilling fluid in an amount sufficient to block the flow of fluid into the subterranean formation.

DETAILED DESCRIPTION OF THE INVENTION

The drilling fluid additive of the present invention comprise particles of elastomers which exhibit swelling when contacted with hydrocarbon fluids, yet do not dissolve in hydrocarbon fluids. This can be achieved by using crosslinked elastomers which swell but do not dissolve in the presence of a hydrocarbon fluid. The swelling elastomers are such that little, if any, swelling occurs until the polymer has reached the lost circulation zone in the well to be sealed. This is accomplished without resort to coatings on the polymer or suspending the polymer with aqueous pill.

The preferred elastomer used in the practice of this invention is crumb rubber. Crumb rubber generally comprises rubber derived from recycled tires or scrap material from the manufacture of tires. Crumb rubber particles are generally of ⅜-inch or less in size. In the practice of the invention, the crumb rubber should have a mixture of particle sizes ranging of from 1 to 400 microns, preferably 20 to 400 microns. In the preferred embodiment, the material should include particles of varying diameters within the range stated above.

Crumb rubber can be prepared several different ways. In the first method, whole tires are cryogenically frozen and then shattered in a hammer mill to break down the tire into the desired particle sizes and to remove the steel and fibers from the tire. A second method involves physically tearing the tire apart and removing the unwanted steel and fibers. In this process, the tire is continuously milled until the desired particle sizes are obtained. Another source of crumb rubber is the bushings that remain as the tire is manufactured or remanufactured.

One key feature of crumb rubber that makes it useful in the practice of the invention is its ability to expand up to 140% of its original size when exposed to hydrocarbon fluids and temperatures. As shown in the examples below, when the elastomer particles are exposed to hydrocarbon fluids and temperatures typically encountered in a well (200° F. to 300° F.) the particles expand to over 140% of their original size. The amount of expansion is dependent upon the hydrocarbon used and the temperature in the well.

The expansion of the elastomer is not immediate, often taking several hours before a significant increase is seen. The delay in expansion of the crumb rubber means that the crumb rubber can be easily pumped down a well bore without resort to coatings or the use of an aqueous pill. The crumb rubber can then flow into the pores and cracks. Once in the cracks and pores, the crumb rubber will expand to fill the cracks and pores without dissolving into the drilling fluid. Thus, while crumb rubber is the preferred elastomer in the practice of the invention, any elastomer which exhibits the same swelling and solubility characteristics as crumb rubber may be used.

Another feature of the present invention is the relatively low density of the elastomer particles, relative to the fluid. This allows a higher additive loading without adversely affecting the properties of the drilling fluid. For example, the elastomers of the invention can be used in amounts up to 100 lbs. per barrel (ppb)whereas conventional fluid loss additives can be used in amounts ranging from 5 to 20 lbs. per barrel. The ability to use higher additive loadings means that more of the elastomer particles are present in the fluid to fill and plug the openings into the subterranean formation.

This last feature is particularly important in deepwater operations where the drilling fluids used require a narrow density range. Typically the fluids used in these applications have a density of from 9.5 to 10.5 pounds per gallon (ppg). The elastomer particles of the invention have a density of from 8.5 to 10.5 ppg. Thus, the addition of the additives of the invention do not adversely affect the density drilling muds.

Illustrative hydrocarbon fluids useful in this invention include crude oil, diesel oil, kerosene, mineral oil, gasoline, naptha, toluene, ethylenedichloride and mixtures thereof. In addition, synthetic oils such as those derived from olefins, linear α-olefins, poly α-olefins, internal esters and ethers may be used. Because of economics, availability at any drilling site and performance, diesel oil is most preferred. Synthetic oils, however, are preferred where environmental impact is a concern.

The drilling fluid additives of the present invention can be used in both hydrocarbon based and aqueous or water based drilling fluids. If polymer expansion is needed in an aqueous system, a hydrocarbon fluid must be added to the elastomer particles to achieve the desired expansion. It has been observed, however, that improved fluid loss can be achieved in aqueous drilling fluids without adding a hydrocarbon fluid. The improved fluid loss reduction is achieved by the ability to use higher amounts of particles One method for practicing this invention involves the injection of a discrete pill of drilling fluid containing the drilling fluid additives of the invention in a sufficient amount to seal off the lost circulation zone. This pill is then forced down to the lost circulation zone. The elastomer particles then fill the holes and fractures preventing loss of the fluid. Depending upon the polymer and the composition of the drilling fluid, about two to about 250 pounds of polymer per barrel of fluid can be placed in the pill. Methods for introducing the pill containing the drilling fluid additive of the invention are well known to those in the art.

Other matter may be added to the pill to enhance the sealing properties of the fluid. For example, cellulose fiber from plant matter such as peanut shells, sugar cane husks or bagasse, almond shells, walnut shells, dried tumbleweed and paper, may be added to the pill. Bridging materials such as calcium carbonate may also be added. Coarse and fine mica can also be used.

To help maintain the seal established by the polymer containing pill and to prevent loss to new fractures, the polymer of the invention can be continuously added to the drilling fluid. In these cases, the polymer should be added at a rate of 100 to 250 pounds per hour to the drilling fluid.

EXAMPLES

Example 1

In this example, samples of crumb rubber were exposed to various hydrocarbon fluids to measure the degree of expansion over time. In each experiment, 20 mls of the base fluid were added to a 150 mm test tube. To this was added 2.29 gms of crumb rubber. The tube was then shaken to set the crumb rubber. The total height of the fluid and crumb rubber was measured at 108 mm. The height of the rubber in each sample was 33 mm. The hydrocarbon fluids used in these tests were two commercial internal olefin fluids, a linear α-olefin fluid and #2 diesel.

The test tube was then placed in a Baroid 500 ml static-aging cell which was then pressurized to 300 psi with nitrogen. The cell was then placed in an oven at the temperatures noted in the tables and static-aged for three days. A duplicate sample was static-aged for seven days.

After static-aging, the test tubes were removed from the test cells and the height of the rubber was measured. The amount of expansion was calculated using the formula ("height after aging/33)−1." The results are reported in Tables 1 and 2.

TABLE 1

Solubility and Percent Expansion of NER PipeRubber after three day tests

| Temperature | IO Base #1 | LAO Base | IO Base #2 | #2 Diesel |
|---|---|---|---|---|
| 200° F. | 103% | 97% | 127% | 158% |
| 250° F. | 109% | 109% | 97% | 152% |
| 300° F. | 112%* | 112%* | 97% | 158%* |

*Denotes partial solubility of PipeRubber in Base Fluid.

TABLE 2

Solubility and Percent Expansion of NER PipeRubber after seven day tests

| Temperature | IO Base #1 | LAO Base | IO Base #2 | #2 Diesel |
|---|---|---|---|---|
| 200° F. | 82% | 97% | 103% | 106% |
| 250° F. | 112% | 118% | 118% | 158% |
| 300° F. | 127% | 97%* | 112%* | 103%* |

*Denotes partial solubility of PipeRubber in Base Fluid.

Example 2

In this example, a well was experiencing significant loss of drilling fluid. Traditional loss prevention treatments with agents such as calcium carbonate, fiber and graphite materials proved ineffective in reducing or stopping the loss.

A combination of 30 pound per barrel of crumb rubber with 20 pounds per barrel of fiber were added to the drilling fluid. After the initial loading of crumb rubber and fiber, a maintenance load of 250 pounds of crumb rubber and 150 pounds of fiber per hour of pumping were used . The result was little or no additional loss of drilling fluid during the rest of the drilling process.

Example 3

In this example, a deepwater drilling rig was experiencing fluid losses of from 50 to 60 barrels an hour. Attempts to use conventional fluid loss control agents proved unsuccessful.

Two 50-barrel pills of fluid were prepared, each containing 15 pounds per barrel of crumb rubber were pumped into the well. After these pills were pumped into the well, the rate of fluid loss dropped to between 10 and 20 barrels an hour.

I claim:

1. A drilling fluid additive comprising crumb rubber particles, said particles having a diameter of from 1 to 400 microns, and a hydrocarbon fluid.

2. The drilling fluid additive of claim 1 wherein said crumb rubber particles vary in size from 20 to 400 microns.

3. The drilling fluid additive of claim 1 wherein said crumb rubber particle has a density of from 8.5 to 10.5 ppg.

4. The drilling fluid additive of claim 1 wherein said hydrocarbon fluid is selected from the group consisting of crude oil, diesel oil, kerosene, mineral oil, gasoline, naphtha, toluene, ethylenedichloride, synthetic oils and mixtures thereof.

5. The drilling fluid additive of claim 1 further comprising cellulose fiber.

6. The drilling fluid additive of claim 1 wherein said hydrocarbon fluid is diesel oil.

7. The drilling fluid additive of claim 1 wherein such crumb rubber is capable of expanding to at least 40% of its original size upon exposure to hydrocarbon fluids.

8. A drilling fluid additive for reducing lost circulation of drilling fluids comprising:
   (a) crumb rubber particles capable of expanding upon exposure to heat, said particles having a diameter of from 1 to 400 microns; and
   (b) a hydrocarbon fluid.

9. The drilling fluid additive of claim 8 wherein said crumb rubber particles have a density of from 8.5 to 10.5 ppg.

10. The drilling fluid additive of claim 8 wherein said crumb rubber particles are capable of expanding at least 40% of their original size upon exposure to a hydrocarbon fluid.

11. A method of reducing lost circulation and well comprising:
    (a) preparing a pill of crumb rubber particles and a hydrocarbon fluid, said crumb rubber paticles having a diameter of from 1 to 400 microns;
    (b) injecting said pill into said well; and
    (c) forcing said pill into a lost circulation zone.

12. The method of claim 11 wherein the crumb rubber has particles varying in size from 20 to 400 microns.

13. The method of claim 11 wherein said hydrocarbon fluid is selected from the group consisting of crude oil, diesel oil, kerosene, mineral oil, gasoline, naphtha, toluene, ethylenedichloride and mixtures thereof.

14. The method of claim 11 wherein said hydrocarbon fluid comprises diesel oil.

\* \* \* \* \*